United States Patent
Chou et al.

(10) Patent No.: US 9,975,110 B1
(45) Date of Patent: May 22, 2018

(54) METHOD FOR PRODUCING METAL CATALYST NANOPARTICLES

(71) Applicant: HONDA MOTOR CO., LTD., Tokyo (JP)

(72) Inventors: Nam Hawn Chou, Dublin, OH (US); Ryan K. McKenney, Upper Arlington, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 0 days. days.

(21) Appl. No.: 15/360,312

(22) Filed: Nov. 23, 2016

(51) Int. Cl.
*B01J 23/72* (2006.01)
*B01J 37/16* (2006.01)
*B01J 35/00* (2006.01)
*B01J 35/02* (2006.01)

(52) U.S. Cl.
CPC .......... *B01J 23/72* (2013.01); *B01J 35/0013* (2013.01); *B01J 35/023* (2013.01); *B01J 37/16* (2013.01)

(58) Field of Classification Search
CPC ........ B01J 37/16; B01J 23/72; B01J 35/0013; B01J 35/023
See application file for complete search history.

(56) References Cited

U.S. PATENT DOCUMENTS

| | | | | |
|---|---|---|---|---|
| 6,262,129 B1 * | 7/2001 | Murray | ............... | B01J 35/0013 106/1.27 |
| 6,958,308 B2 * | 10/2005 | Brown | .................... | B01J 21/18 427/115 |
| 7,232,474 B2 * | 6/2007 | Bouvrette | ............ | B01J 35/0013 75/362 |
| 7,381,682 B1 * | 6/2008 | Jia | ......................... | B01D 53/864 502/327 |
| 7,381,683 B1 * | 6/2008 | Wang | ................... | B01D 53/864 502/326 |
| 7,491,675 B2 * | 2/2009 | Deevi | .................... | A24B 15/28 502/184 |
| 7,842,641 B2 * | 11/2010 | Fu | .......................... | B82Y 30/00 502/172 |
| 8,075,859 B2 * | 12/2011 | Fu | .......................... | B82Y 30/00 423/239.1 |
| 8,133,932 B2 | 3/2012 | Kijlstra et al. | | |
| 8,227,022 B2 | 7/2012 | Magdassi et al. | | |

(Continued)

FOREIGN PATENT DOCUMENTS

| | | |
|---|---|---|
| CN | 1196553 C | 4/2005 |
| CN | 101656313 A | 2/2010 |

(Continued)

OTHER PUBLICATIONS

Capek, "Preparation of metal nanoparticles in water-in-oil (w/o) microemulsions", Advances in Colloid and Interface Science 110, pp. 49-74, 2004.

(Continued)

*Primary Examiner* — Cam N. Nguyen
(74) *Attorney, Agent, or Firm* — Arent Fox LLP (57) ABSTRACT

A method for producing metal catalyst nanoparticles with a predetermined and/or narrow particle size distribution, and/or a predetermined size, wherein the method comprising a first quenching step and a second quenching step, which may, at least in part, determine the obtained metal catalyst nanoparticles' particle size distribution and/or size.

20 Claims, 7 Drawing Sheets

(56) References Cited

U.S. PATENT DOCUMENTS

| | | | | |
|---|---|---|---|---|
| 8,592,339 | B2* | 11/2013 | Fang | B01J 23/8906 502/326 |
| 8,870,998 | B2 | 10/2014 | Nolte et al. | |
| 8,993,198 | B2* | 3/2015 | Yu | B01J 23/42 429/524 |
| 9,095,898 | B2 | 8/2015 | Zinn | |
| 9,463,444 | B2* | 10/2016 | Xu | B01J 23/44 |
| 9,700,940 | B2* | 7/2017 | Zinn | B22F 1/0007 |
| 2005/0209095 | A1* | 9/2005 | Brown | B01J 21/18 502/150 |
| 2012/0308460 | A1* | 12/2012 | Fu | B82Y 30/00 423/239.1 |
| 2013/0177838 | A1* | 7/2013 | Wang | B01J 23/52 429/524 |
| 2013/0219979 | A1 | 8/2013 | Deb | |
| 2015/0217374 | A1 | 8/2015 | Kim et al. | |
| 2016/0067776 | A1* | 3/2016 | Zinn | B22F 1/0018 428/546 |
| 2017/0246690 | A1* | 8/2017 | Murphy | B22F 9/24 |

FOREIGN PATENT DOCUMENTS

| | | |
|---|---|---|
| CN | 101332999 B | 9/2010 |
| CN | 101474678 B | 9/2010 |
| CN | 102601384 B | 1/2014 |
| CN | 101618462 B | 9/2014 |
| JP | 4725459 B2 | 7/2011 |
| JP | 5846602 B2 | 1/2016 |
| KR | 10-2008-0020159 A | 3/2008 |
| KR | 10-1271596 B1 | 5/2013 |
| KR | 10-1276595 B1 | 6/2013 |
| KR | 10-1513927 B1 | 4/2015 |
| WO | WO 2009/038207-1 | 3/2009 |

OTHER PUBLICATIONS

Chen et al., "Synthesis of Nickel Nanoparticles in Water-in-Oil Microemulsions", Research Express@NCKU, vol. 21, Issue 9, Mar. 16, 2012.

Guzman et al., "Synthesis of silver nanoparticles by chemical reduction method and their antibacterial activity", International Journal of Chemical and Biomolecular Engineering 2:3, pp. 104-111, 2009.

Wu et al., "Synthesis and characterization of nickel nanoparticles by hydrazine reduction in ethylene glycol", Journal of Colloid and Interface Science 259, pp. 282-286, 2003.

* cited by examiner

METHOD FOR PRODUCING METAL CATALYST NANOPARTICLES

FIELD

The present disclosure relates generally to a method for producing metal catalyst nanoparticles with a predetermined and/or narrow particle size distribution, and/or a predetermined size.

BACKGROUND

Over the past several decades, metal nanoparticles have proven useful in various applications, for example, in coating materials and coating systems, glasses and vitreous coatings, inks including printing inks, plastics, foams, cosmetics, cleaning compositions and impregnating materials, adhesives, sealing compounds, and catalyst systems.

Catalyst systems comprising metal catalyst nanoparticles are of particular interest since nanoparticles provide an exceptionally high surface area compared to their bulk counterparts, thereby increasing a system's catalytic activity. However, while there are various methods for the production of metal catalyst nanoparticles, there remains a need in the art for a method for preparing metal catalyst nanoparticles that allows control over the particle size distribution and/or particle size of the obtained metal catalyst nanoparticles.

SUMMARY

The present disclosure relates generally to a method for producing metal catalyst nanoparticles with a predetermined and/or narrow particle size distribution, and/or a predetermined size. The method may comprise a first quenching step and a second quenching step, wherein each of the two quenching steps may, at least in part, determine the obtained metal catalyst nanoparticles' particle size distribution and/or size.

The method of the present disclosure may comprise the steps of providing a metal catalyst precursor solution, producing a combined solution by continuously feeding a reducing agent solution to the metal catalyst precursor solution over a period of time to initiate nucleation and/or growth of metal catalyst nanoparticles, and quenching the combined solution. Quenching may comprise at least two quenching steps, the at least two steps being the same or different.

DETAILED DESCRIPTION OF THE INVENTION

The present disclosure relates generally to a method for producing metal catalyst nanoparticles with a predetermined and/or narrow particle size distribution, and/or a predetermined size. The method may comprise a first quenching step and a second quenching step, wherein each of the two quenching steps may, at least in part, determine the obtained metal catalyst nanoparticles' particle size distribution and/or size.

The method of the present disclosure may comprise the steps of providing a metal catalyst precursor solution, producing a combined solution by continuously feeding a reducing agent solution to the metal catalyst precursor solution over a period of time, to (to ending at a time point $t_1$), to initiate nucleation and/or growth of metal catalyst nanoparticles, and quenching the combined solution. Quenching may comprise two steps, wherein the two steps are the same or different. For example, the two steps may comprise quenching the combined solution with a gaseous quenching agent (e.g., air) and/or a liquid quenching agent (e.g., comprising citric acid).

The method of the present disclosure may comprise providing a metal catalyst precursor solution. The metal catalyst precursor solution may comprise a metal and/or a surfactant distributed in a solvent. Without being limited to a particular theory, the surfactant in the metal catalyst precursor solution may form a micelle with the metal in the center.

The metal may be in the form of one or more metal salts and/or hydrates thereof. The one or more metal salts may comprise one or more metal ions of any metal useful as a metal catalyst. Examples of metals useful as a metal catalyst according to the present disclosure include, but are not limited to, iron, ruthenium, osmium, cobalt, rhodium, iridium, nickel, palladium, platinum, copper, silver, gold, zinc, and cadmium. The one or more metal salts may comprise one or more counterions. Examples of counterions according to the present disclosure include but are not limited to nitrate, chloride, bromide, sulphate, carbonate, acetate, tetrafluoroborate, and tetraphenylborate. For example, the metal catalyst precursor solution may comprise copper(II) chloride dihydrate ($CuCl_2 \cdot 2H_2O$).

Examples of surfactants useful in the metal catalyst precursor solution according to the present disclosure include but are not limited to cetyl trimethylammonium bromide (CTAB), sodium dodecylbenzenesulfonate (SDBS), and Polyvinylpyrrolidone (PVP). For example, the surfactant may comprise cetyl trimethylammonium bromide (CTAB).

The metal, metal salt, and/or surfactant may be distributed in a solvent. The solvent may comprise an organic solvent. Examples of organic solvents useful in the metal catalyst precursor solution according to the present disclosure include, but are not limited to, ethylene glycol, diethylene glycol, formamide, N,N-dimethylformamide, dimethyl sulfoxide, dimethylpropylene urea, hexamethylphosphoramide, tetrahydrofuran, methyl or ethyl ethers of glyme, diglyme, triglyme, and tetraglyme, and combinations thereof. The solvent may additionally or alternatively comprise an aqueous component.

Without being limited to any particular theory, water may be used as the solvent, as it may allow an easily scalable, benign, and/or economical process.

The metal and/or metal salt may be present in the metal catalyst precursor solution at a concentration suitable for forming metal catalyst nanoparticles. The metal and/or metal salt may be present in the metal catalyst precursor solution at a concentration of between 10 and 30 mM, preferably between 15 and 25 mM. For example, the metal and/or metal salt may be present in the metal catalyst precursor solution at a concentration of 15 mM, or at a concentration of 20 mM.

The surfactant may be present in the metal catalyst precursor solution at a concentration of between 15 and 25 mM, preferably between 16 and 24 mM, more preferably between 17 and 23 mM, even more preferably between 18 and 22 mM, and most preferably between 19 and 21 mM. For example, the surfactant may be present in the metal catalyst precursor solution at a concentration of 20 mM.

For example, the metal catalyst precursor solution may comprise $CuCl_2.2H_2O$ at a concentration of 15.6 mM and CTAB at a concentration of 20.8 mM. In another example, the metal catalyst precursor solution may comprise $CuCl_2.2H_2O$ at a concentration of 20.43 mM and CTAB at a concentration of 20.1 mM. The metal catalyst precursor solution may also comprise additional components, such as ammonium hydroxide.

The method of the present disclosure may comprise continuously combining a reducing agent solution and the metal catalyst precursor solution over a period of time to initiate nucleation and/or growth of metal catalyst nanoparticles. For example, the method of the present disclosure may comprise continuously feeding a reducing agent solution to the metal catalyst precursor solution over a period of time. According to some aspects, the reducing agent solution and the metal catalyst precursor solution may be combined in a certain environment, for example, an environment free of oxygen.

The reducing agent solution may comprise one or more reducing agents and/or surfactants. As used herein, the term "reducing agent" refers to a substance capable of reducing ions in the metal catalyst precursor solution, particularly metal ions. Examples of reducing agents according to the present disclosure include, but are not limited to, polyalcohols, aminophenols, amino alcohols, aldehydes, sugars, tartaric acid, ascorbic acid, triethanolamine, hydroquinone, sodium dithionite, hydroxymethanesulphinic acid, sodium disulphite, formamidinesulphinic acid, *sulphurous* acid, hydrazine, hydroxylamine, ethylenediamine, tetramethylethylenediamine, hydroxylamine sulphate, sodium borohydride, formaldehyde, alcohols, ethanol, n-propanol, isopropanol, n-butanol, iso-butanol, sec-butanol, ethylene glycol, ethylene glycol diacetate, glycerol, dimethylaminoethanol, and salts and/or combinations thereof. The reducing agent may be provided in excess with respect to the metal catalyst precursor.

Examples of surfactants useful in the reducing agent solution according to the present disclosure include but are not limited to cetyl trimethylammonium bromide (CTAB), sodium dodecylbenzenesulfonate (SDBS), citric acid, and Polyvinylpyrrolidone (PVP). For example, the surfactant may comprise cetyl trimethylammonium bromide (CTAB).

The reducing agent solution may comprise more than one surfactant in a certain molar ratio. For example, the reducing agent solution may comprise a CTAB to citric acid molar ratio of between 1:1 to 20:1, preferably between 5:1 to 15:1, and more preferably between 9:1 and 11:1. According to some aspects, the reducing agent solution may comprise a CTAB to citric acid molar ratio of 10.38:1.

Without being limited to a particular theory, the surfactant (such as CTAB) may facilitate mixing of the metal catalyst precursor solution and the reducing agent solution when the metal catalyst precursor solution also includes a surfactant (such as CTAB). For example, the presence of CTAB in the metal precursor solution may form a micelle (with copper chloride inside) and the presence of CTAB and citric acid in the reducing agent solution may form a micelle with the reducing agent (such as hydrazine) in the center. Mixing of the two micelle systems produces a better product as opposed to adding the reducing without a surfactant present in the reducing agent solution. Although citric acid is used later in the method as a quenching agent, it has been found that the inclusion of some citric acid, for example, as a surfactant in the reducing agent solution does not negatively impact the formation of the metal nanoparticles, and is actually useful for producing smaller particle sizes. However, citric acid is not included in the metal precursor solution as the reaction would likely be quickly quenched.

The one or more reducing agents and/or surfactants may be distributed in a solvent. For example, the solvent may be an organic solvent. Examples of organic solvents useful in the reducing agent solution according to the present disclosure include, but are not limited to, ethylene glycol, diethylene glycol, formamide, N,N-dimethylformamide, dimethyl sulfoxide, dimethylpropylene urea, hexamethylphosphoramide, tetrahydrofuran, methyl or ethyl ethers of glyme, diglyme, triglyme, and tetraglyme, and combinations thereof. For example, the solvent may additionally and/or alternatively comprise an aqueous component.

The one or more reducing agents may be present in the reducing agent solution at a concentration suitable for forming metal catalyst nanoparticles. For example, when the reducing agent solution comprises two or more reducing agents, the two or more reducing agents may be present in the reducing agent solution at the same concentration or at different concentrations.

The one or more reducing agents may be present in the reducing agent solution at a concentration of between 410 and 460 mM, preferably between 420 mM and 450 mM, and more preferably between 430 and 440 mM. The one or more reducing agents may be present in the reducing agent solution at a concentration of 435 mM. Alternatively or additionally, the one or more reducing agents may be present in the reducing agent solution at a concentration of between 10 and 30 M, preferably between 12 and 28 M, and more preferably between 15 and 25 M. The one or more reducing agents may be present in the reducing agent solution at a concentration of 18 M.

The one or more surfactants may be present in the reducing agent solution at a concentration of between 10 and 50 mM, preferably between 20 and 40 mM. The one or more surfactants may be present in the reducing agent solution at a concentration of 20 mM or at a concentration of 30 mM. Alternatively or additionally, the one or more surfactants may be present in the reducing agent solution at a concentration of between 1 and 5 mM, preferably between 2 and 4 mM. The one or more reducing agents may be present in the reducing agent solution at a concentration of 3 mM.

For example, the reducing agent solution may comprise CTAB at a concentration of 20.8 mM, citric acid at a concentration 3.3 mM, and hydrazine at a concentration of 434.9 mM. In another example, the reducing agent solution may comprise CTAB at a concentration of 32.81 mM, citric acid at a concentration 3.16 mM, and hydrazine at a concentration of 17.66 M.

The method of the present disclosure may comprise continuously combining the reducing agent solution with the metal catalyst precursor solution to initiate nucleation and/or growth of metal catalyst nanoparticles. For example, the method may comprise continuously feeding the reducing agent solution to the metal catalyst precursor solution over a period of time, to (to ending at a time point $t_1$), at a particular rate.

Without being limited to a particular theory, combining the reducing agent solution and the metal catalyst precursor solution of the present disclosure (i.e., wherein both solutions may be a micelle system) may produce a better product when compared with a process involving a reducing agent solution without certain components of the present disclosure (e.g., without CTAB and/or citric acid). According to some aspects, small amounts of citric acid in the reducing agent solution may produce a small particle size without quenching the reaction. However, even small amounts of citric acid in the metal catalyst precursor solution may prematurely quench the nucleation and/or growth of metal catalyst nanoparticles.

In one example, the reducing agent solution may be injected into the metal catalyst precursor solution at a rate of between 9 and 15 mL/min, preferably between 10 and 14 mL/min, and even more preferably between 11 and 13 mL/min. The reducing agent solution may be injected into the metal catalyst precursor solution at a rate of 12 mL/min. The reducing agent solution may be injected into the metal catalyst precursor solution over a period of time, to, wherein to is between 0 and 10 minutes, preferably between 1 and 9 minutes, more preferably between 2 and 8 minutes, even more preferably between 3 and 7 minutes, and most preferably between 4 and 6 minutes. The reducing agent solution may be injected into the metal catalyst precursor solution over a period of time, to, wherein to is 5 minutes.

In another example, the reducing agent solution may be injected into the metal catalyst precursor solution over a period of time, to, wherein to is between 5 and 15 minutes, preferably between 6 and 14 minutes, more preferably between 7 and 13 minutes, even more preferably between 8 and 12 minutes, and most preferably between 9 and 11 minutes. The reducing agent solution may be injected into the metal catalyst precursor solution over a period of time, to, wherein to is 10 minutes.

The combined reducing agent and metal catalyst precursor solution may comprise a particular molar ratio of certain components therein. For example, the combined reducing agent and metal catalyst precursor solution may comprise a particular molar ratio of the surfactants of the reducing agent solution to the metal, metal salt, and/or hydrate thereof of the metal catalyst precursor solution. For example, the combined reducing agent and metal catalyst precursor solution may comprise a molar ratio of the surfactant (present in both the reducing agent solution and the metal catalyst precursor solution) of the reducing agent solution to the metal, metal salt, and/or hydrate thereof of the metal catalyst precursor solution of between 1:1 to 10:1, preferably between 1:1 and 5:1, and more preferably between 1:1 and 3:1. According to some aspects, the combined reducing agent and metal catalyst precursor solution may comprise a molar ratio of CTAB and citric acid to $CuCl_2.2H_2O$ of 2.8:1.

The method of the present disclosure may comprise quenching the combined reducing agent and metal catalyst precursor solution. Quenching may occur immediately following $t_1$ and/or after a certain residence time from $t_1$ (that is, immediately following or after a certain residence time from the ending time point of the period of time, to, during which the reducing agent solution and the metal catalyst precursor solution are combined). Quenching may comprise one, two, or more steps, wherein the one, two, or more quenching steps may comprise combining the combined reducing agent and metal catalyst precursor solution with a quenching agent. For example, the method may comprise a first quenching step and a second quenching step, wherein each of the two quenching steps may comprise feeding a quenching agent to the combined reducing agent and metal catalyst precursor solution and/or exposing the combined reducing agent and metal catalyst precursor solution to a quenching agent.

As used herein, the term "quenching" refers to stopping, diminishing, and/or slowing a chemical or enzymatic reaction. For example, "quenching" may refer to stopping, diminishing, and/or slowing the reaction between the reducing agent(s) and the metal catalyst(s) (i.e., the nucleation and/or growth of metal catalyst nanoparticles). As used herein, the term "quenching agent" refers to a substance capable of, at least in part, quenching the reaction between the reducing agent(s) and the metal catalyst(s).

The quenching agent may comprise a gaseous and/or a liquid quenching agent, wherein the gaseous and/or liquid quenching agent may be reactive with the reducing agent but not substantially reactive with the obtained metal catalyst nanoparticles, and/or may coat or otherwise surround the metal nanoparticles to limit access of the reducing agent to the particles thereby inhibiting further growth of the metal nanoparticles. The quenching agent may be present in excess with respect to the metal catalyst precursor solution.

Examples of gaseous quenching agents according to aspects of the present disclosure include, but are not limited to, gases that are less reducing than the atmosphere in which the reducing agent and metal catalyst precursor solutions were combined. As used herein, the term "reducing" refers to the characteristic of a component that "donates" an electron to another chemical species in a redox chemical reaction. The gaseous quenching agent may be air. As used herein, the term "air" refers to normal earth atmosphere, for example, a mixture of nitrogen, oxygen, and small amounts of other gases. For example, the mixing of the metal catalyst precursor solution and the reducing agent occurs in an environment free of oxygen. The mixture is exposed to oxygen (such as in the form of air) to quench the reaction. Without being limited to any particular theory, exposure to oxygen allows for the dispersal of any hydrogen and possibly decomposes any remaining reducing agent to inhibit or otherwise terminate growth of the metal catalyst nanoparticles.

Examples of liquid quenching agents according to aspects of the present disclosure include, but are not limited to, liquids comprising active quenching components such as aldehydes, ketones, nitriles, organic acids, water, and combinations thereof. Specific examples of active quenching components according to the present disclosure include, but are not limited to, acetaldehyde, acetonitrile, formic acid, acetic acid, malic acid, oxalic acid, citric acid, 1-adamantanecarboxylic acid, succinic acid, glucuronic acid, and combinations thereof. According to some aspects, the active quenching component comprises a short chain carboxylic acid. The liquid quenching agent may comprise either citric acid alone or citric acid dispersed in a liquid such as water.

The liquid quenching agent may comprise between 0.01 and 5 mmol of citric acid, preferably between 0.1 and 3 mmol of citric acid. The liquid quenching agent may also comprise between 0.1 and 10 mL of water, preferably between 1 and 9 mL of water, more preferably between 2 and 8 mL of water, even more preferably between 3 and 7 mL of water, and most preferably between 4 and 6 mL of water.

The liquid quenching agent may comprise between 50 and 350 mM of citric acid in water, preferably between about 100 and 300 mM, more preferably between about 150 and 250 mM, and most preferably 200 mM.

The method of the present disclosure may comprise quenching the combined metal catalyst and reducing agent solution after a certain residence time, wherein the residence time ends at the time point when quenching is initiated, $t_2$. As used herein, the term "residence time" refers to the amount of time between the time point when the combination of the reducing agent solution and the metal catalyst precursor solution is completed (i.e., $t_1$) and the time point when quenching is initiated (i.e., $t_2$), such as when a quenching agent is introduced to the combined reducing agent and metal catalyst precursor solution.

Quenching may comprise one, two, or more steps, wherein the one, two, or more steps are the same or different. For example, the method may comprise two different quenching steps.

If quenching comprises two or more steps, the residence time corresponding to each step may be the same or different. That is, the two or more quenching steps may be initiated at the same time point, $t_2$, or at different time points (e.g., $t_2$, $t_3$, $t_4$, etc.) If $t_2$, $t_3$, $t_4$, etc. do not equal $t_1$ (i.e., if the residence time is not zero), the particle size of the metal catalyst may be greater at $t_2$, $t_3$, $t_4$, etc. than at $t_1$.

For example, the method of the present disclosure may comprise two quenching steps, a first quenching step and a second quenching step, initiated at different time points, $t_2$ and $t_3$, respectively, wherein $t_3$ is at the same time or after $t_2$.

The first quenching step may comprise quenching the combined metal catalyst and reducing agent solution with a gaseous quenching agent, such as by bubbling a gaseous quenching agent through the combined reducing agent and metal catalyst precursor solution and/or by exposing the combined reducing agent and metal catalyst precursor solution to air.

The first quenching step may be initiated at a time point $t_2$, wherein $t_2$ is substantially the same as and/or immediately following $t_1$. That is, the residence time corresponding to the first quenching step may be 0.

Without being limited to any particular theory, the first quenching step may, at least in part, determine the obtained metal catalyst nanoparticles' particle size distribution. As used herein, the term "particle size distribution" refers to the relative amount of particles present according to size. The first quenching step may, at least in part, also determine the obtained metal catalyst nanoparticles' size. For example, different amounts of quenching agent may provide different sized metal catalyst nanoparticles. That is, if all other reaction conditions are held constant, a larger amount of quenching agent used in the first quenching step may produce smaller metal catalyst nanoparticles than a smaller amount of quenching agent.

For example, the first quenching step may, at least in part, produce a particle size distribution wherein at least 90% of the obtained metal catalyst nanoparticles have a diameter of within a 10 nm range, preferably within a 9 nm range, more preferably without an 8 nm range, even more preferably within a 7 nm range, even more preferably within a 6 nm range, even more preferably within a 5 nm range, even more preferably within a 4 nm range, even more preferably within a 3 nm range, even more preferably within a 2 nm range, and most preferably within a 1 nm range.

Without being limited to any particular theory, it is believed that the first quenching step (e.g., exposing the combined reducing agent and metal catalyst precursor solution to air) may limit the metal catalyst nanoparticles to a narrow particle size distribution without completely inhibiting the growth of the nanoparticles.

The second quenching step may comprise quenching the combined metal catalyst and reducing agent solution with a liquid quenching agent, such as by injecting the liquid quenching agent into the combined reducing agent and metal catalyst precursor solution (e.g., via syringe).

The second quenching step may be initiated at a time point $t_3$, wherein $t_3$ is at the same time or after $t_2$. That is, the residence time corresponding to the second quenching step may be greater than or equal to 0.

For example, $t_3$ may be between 0 and 120 minutes after $t_1$, preferably between 20 and 100 minutes after $t_1$, more preferably between 40 and 80 minutes after $t_1$, and most preferably between 50 and 70 minutes after $t_1$. According to some aspects, $t_3$ may be 60 minutes after $t_1$. That is, the second quenching step may be initiated 60 minutes after the reducing agent solution and the metal catalyst precursor solution have been completely combined.

The second quenching step may, at least in part, determine the obtained metal catalyst nanoparticles' size. For example, different amounts of quenching agent may provide different sized metal catalyst nanoparticles. That is, if all other reaction conditions are held constant, a larger amount of quenching agent used in the second quenching step may produce smaller metal catalyst nanoparticles than a smaller amount of quenching agent. The second quenching step may, at least in part, completely stop the metal catalyst nanoparticles' growth.

For example, if a liquid quenching agent comprising 2.5 mmol of citric acid dissolved in 5 mL of deionized water is used in the second quenching step, the obtained nanoparticles may have an average diameter of 2.2 nm. If a liquid quenching agent comprising 1.0 mmol of citric acid dissolved in 5 mL of deionized water is used in the second quenching step, the obtained nanoparticles may have an average diameter of 6.3 nm.

The obtained metal catalyst nanoparticles may have an average diameter of between 0 and 10 nm, preferably between 0.01 and 9 nm, more preferably between 0.1 and 8 nm, and even more preferably between 1 and 7 nm. In some examples, the obtained metal catalyst nanoparticles may have a diameter of 2 nm. In other examples, the obtained metal catalyst nanoparticles may have a diameter of 6 nm. However, it will be appreciated that any size metal catalyst nanoparticle may be obtained using the method of the present disclosure, for example, metal catalyst nanoparticles which are larger or smaller than the ranges described herein. For example, the obtained metal catalyst nanoparticles may have an average diameter of anywhere between 0 and 100 nm.

It should be understood that according to some aspects of the present disclosure, it is possible to obtain metal catalyst nanoparticles with a narrow particle size distribution (e.g., due, at least in part, to the first quenching step), wherein the size of the obtained metal catalyst nanoparticles may be controlled (e.g., due, at least in part, by modifying aspects of the second quenching step), as described herein. The method according to the present disclosure thus advantageously allows control over both particle size distribution and size, such that the final nanoparticle size can be specifically tailored.

The method of the present disclosure may optionally comprise removing the obtained metal catalyst nanoparticles from the solution by any method known in the art. For example, the obtained metal catalyst nanoparticles may be removed from the solution via centrifugation in order to separate the obtained metal catalyst nanoparticles from the supernatant. According to some aspects, removing the solution may occur after a certain residence time from the last quenching step. For example, removing the solution may occur between about 0 to 120 minutes, preferably between about 30 to 90 minutes, and most preferably 60 minutes after the last quenching step is complete.

The method of the present disclosure may optionally comprise redispersing the obtained metal catalyst nanoparticles by any method known in the art (e.g., redispersing the obtained metal catalyst nanoparticles in a medium other than medium in which the metal catalyst nanoparticles were produced).

The metal catalyst nanoparticle dispersion obtained by the method of the present disclosure may be used in its entirety. (That is, the metal catalyst nanoparticles may remain in the medium in which they were produced.)

One or more of the steps of the method according to the present disclosure may be performed at room temperature. As used herein, the term "room temperature" refers to the ambient temperature of the room wherein the reaction is performed. For example, room temperature may be a temperature from 21 to 27° C., preferably 23° C.

The present disclosure also relates to metal catalyst nanoparticles obtainable by the methods disclosed herein.

While the aspects described herein have been described in conjunction with the example aspects outlined above, various alternatives, modifications, variations, improvements, and/or substantial equivalents, whether known or that are or may be presently unforeseen, may become apparent to those having at least ordinary skill in the art. Accordingly, the example aspects, as set forth above, are intended to be illustrative, not limiting. Various changes may be made without departing from the spirit and scope of the disclosure. Therefore, the disclosure is intended to embrace all known or later-developed alternatives, modifications, variations, improvements, and/or substantial equivalents.

Thus, the claims are not intended to be limited to the aspects shown herein, but are to be accorded the full scope consistent with the language of the claims, wherein reference to an element in the singular is not intended to mean "one and only one" unless specifically so stated, but rather "one or more." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

Further, the word "example" is used herein to mean "serving as an example, instance, or illustration." Any aspect described herein as "example" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. Nothing disclosed herein is intended to be dedicated to the public regardless of whether such disclosure is explicitly recited in the claims.

The following examples are put forth so as to provide those of ordinary skill in the art with a complete disclosure and description of how to make and use the present invention, and are not intended to limit the scope of what the inventors regard as their invention nor are they intended to represent that the experiments below are all or the only experiments performed. Efforts have been made to ensure accuracy with respect to numbers used (e.g. amounts, dimensions, etc.) but some experimental errors and deviations should be accounted for.

Example 1—Production of 2.2 nm Copper Nanoparticles

First, in order to adjust the solution's pH to about 10, 14.5 M (0.5 mL) of $NH_4OH$ was added to a stirring metal catalyst precursor solution comprising 20.43 mM of $CuCl_2.2H_2O$ (0.24 g, 1.4 mmol) and 20.1 mM of CTAB (0.68 g, 1.87 mmol) in 93 mL of deionized water in a Schlenk flask at room temperature (i.e., 23° C.) under argon. A reducing agent solution was prepared by adding 17.66 M of hydrazine hydrate (50-60%, 3 mL) to a solution comprising 32.81 mM of CTAB (0.68 g, 1.87 mmol) and 3.16 mM of citric acid monohydrate (0.036 g, 0.18 mmol) in 57 mL of deionized water. The reducing agent solution was then injected into the flask over 5 minutes via a 60 mL syringe and a syringe pump. Upon injection of the reducing agent solution, the combined metal catalyst precursor and reducing agent solution changed from a tan color to clear.

Immediately following the reducing agent solution injection, the combined solution was allowed to stir in open air (i.e., the argon line was removed). The combined solution became a deep purple color. Immediately following the removal of the argon line, a solution comprising 2.5 mmol (0.53 g) of citric acid dissolved in 5 mL of deionized water was injected into the flask via a syringe and a needle all at once. The mixture was then stirred for 1 hour, open to air.

The obtained metal catalyst nanoparticles were then separated by centrifuge (5 minutes at 12,000 rpm) using falcon tubes. The supernatant was discarded and the obtained metal catalyst nanoparticles were washed twice with ethanol (10 mL each wash).

Figure 1:
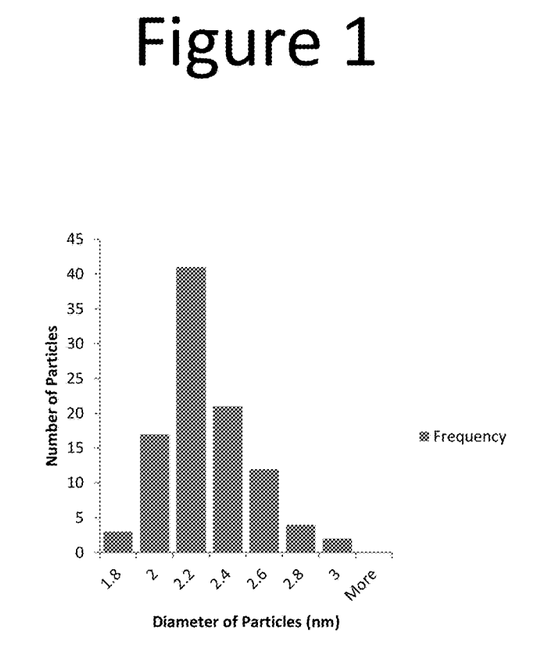
FIG. 1 shows an example of a histogram of the particle size distribution of metal catalyst nanoparticles obtained in Example 1.

FIG. 1 shows a histogram of the particle size distribution of the obtained metal catalyst nanoparticles. As can be seen by the histogram, the majority of the obtained metal catalyst nanoparticles had a diameter of between 1.8 nm and 3 nm, with the largest number having a diameter of 2.2 nm.

Figure 3A:
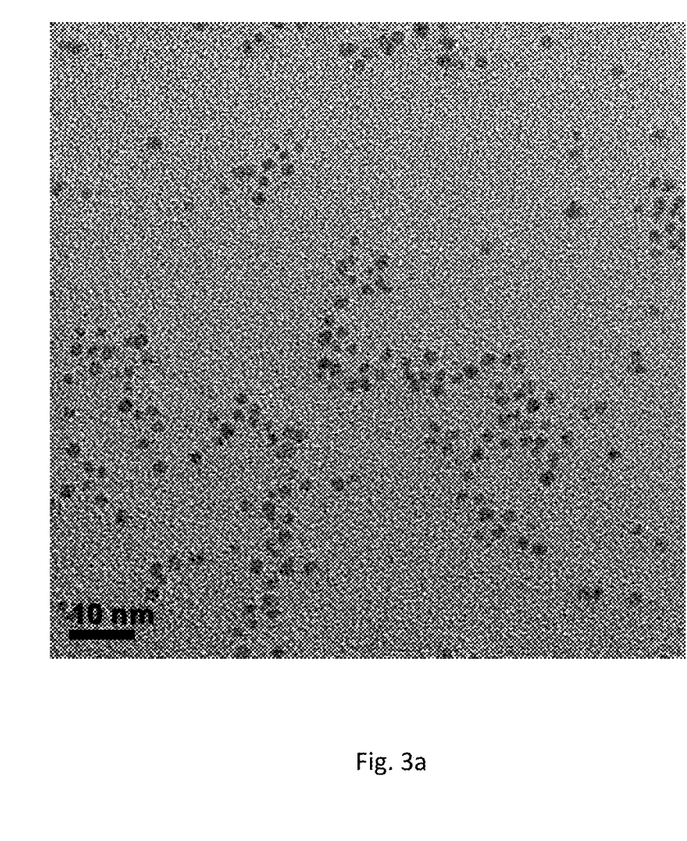
FIG. 3a shows a Transmission Electron Microscopy (TEM) image of metal catalyst nanoparticles obtained in Example 1.
Figure 4A:
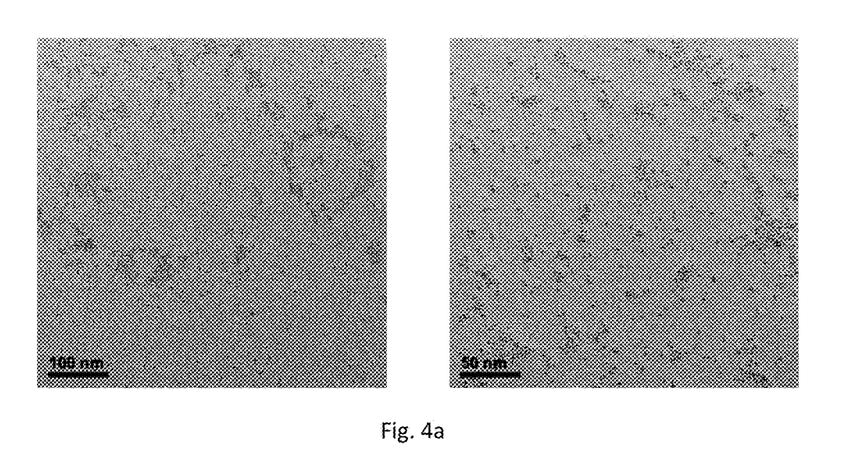
FIG. 4a shows a low magnification TEM image of metal catalyst nanoparticles obtained in Example 1.
Figure 4B:
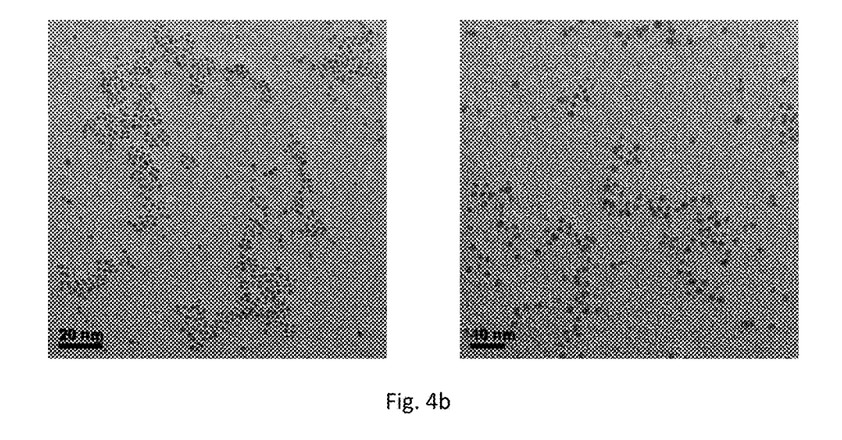
FIG. 4b shows a high magnification TEM image of metal catalyst nanoparticles obtained in Example 1.

FIG. 3a shows an image of the obtained metal catalyst nanoparticles prepared in Example 1 using Transmission Electron Microscopy (TEM). As can be seen by the image, the obtained metal catalyst nanoparticles are consistently sized and are well-formed. FIG. 4 also shows images of the obtained metal catalyst nanoparticles prepared in Example 1 using TEM. Specifically, FIG. 4a shows a low magnification image of the obtained metal catalyst nanoparticles, which demonstrates the large area of the nanoparticles. FIG. 4b shows a high magnification TEM image of the obtained metal catalyst nanoparticles, wherein the high quality of the nanoparticles is apparent.

Figure 5:
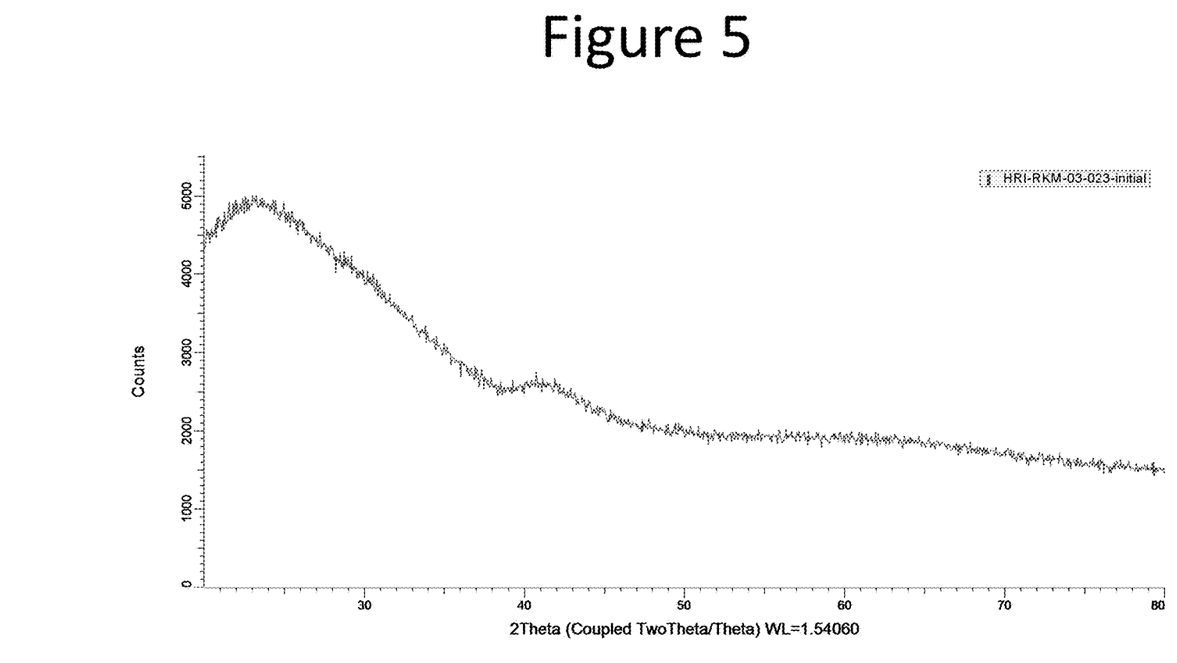
FIG. 5 shows an X-ray diffractogram corresponding to metal catalyst nanoparticles obtained in Example 1.

FIG. 5 shows an X-ray diffractogram corresponding to metal catalyst nanoparticles obtained in Example 1.

Example 2—Production of 6.3 nm Copper Nanoparticles

First, in order to adjust the solution's pH to about 10, 14.5 M (0.5 mL) of $NH_4OH$ was added to a stirring metal catalyst precursor solution comprising 20.43 mM of $CuCl_2.2H_2O$ (0.24 g, 1.4 mmol) and 20.1 mM of CTAB (0.68 g, 1.87 mmol) in 93 mL of deionized water in a Schlenk flask at room temperature (i.e., 23° C.) under argon. A reducing agent solution was prepared by adding 17.66 M of hydrazine hydrate (50-60%, 3 mL) to a solution comprising 32.81 mM of CTAB (0.68 g, 1.87) and 3.16 mM of citric acid monohydrate (0.036 g, 0.18 mmol) in 57 mL of deionized water. The reducing agent solution was then injected into the flask over 5 minutes via a 60 mL syringe and syringe pump. Upon injection of the reducing agent solution, the combined metal catalyst precursor and reducing agent solution changed from a tan color to clear.

Immediately following the reducing agent solution injection, the combined solution was allowed to stir in open air (i.e., the argon line was removed). The combined solution became a deep purple color. Immediately following the removal of the argon line, a solution comprising 1.0 mmol (0.21 g) of citric acid dissolved in 5 mL of deionized water was injected into the flask via a syringe and a needle all at once. The mixture was then stirred for 1 hour, open to air.

The obtained metal catalyst nanoparticles were then separated by centrifuge (5 minutes at 12,000 rpm) using falcon tubes. The supernatant was discarded and the obtained metal catalyst nanoparticles were washed twice with ethanol (10 mL).

Figure 2:
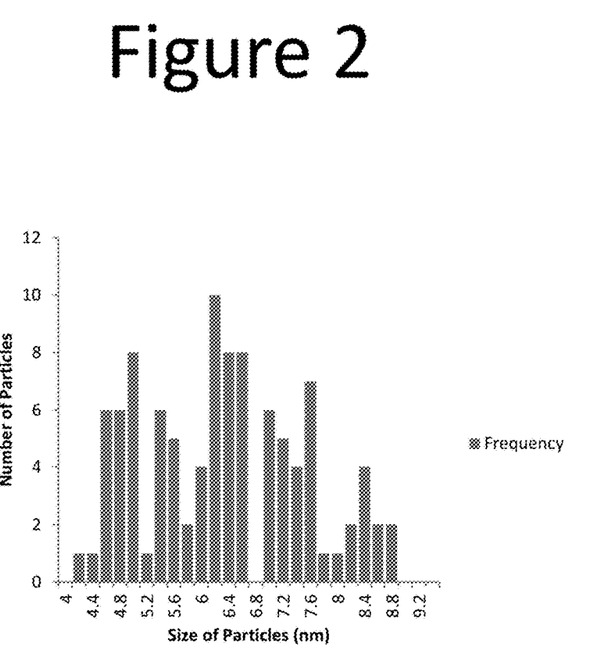
FIG. 2 shows an example of a histogram of the particle size distribution of metal catalyst nanoparticles obtained in Example 2.

FIG. 2 shows a histogram of the particle size distribution of the obtained metal catalyst nanoparticles. As can be seen by the histogram, the majority of the obtained metal catalyst nanoparticles had a diameter of between 4.2 nm and 8.8 nm, with the largest number having a diameter of 6.3 nm.

Figure 3B:
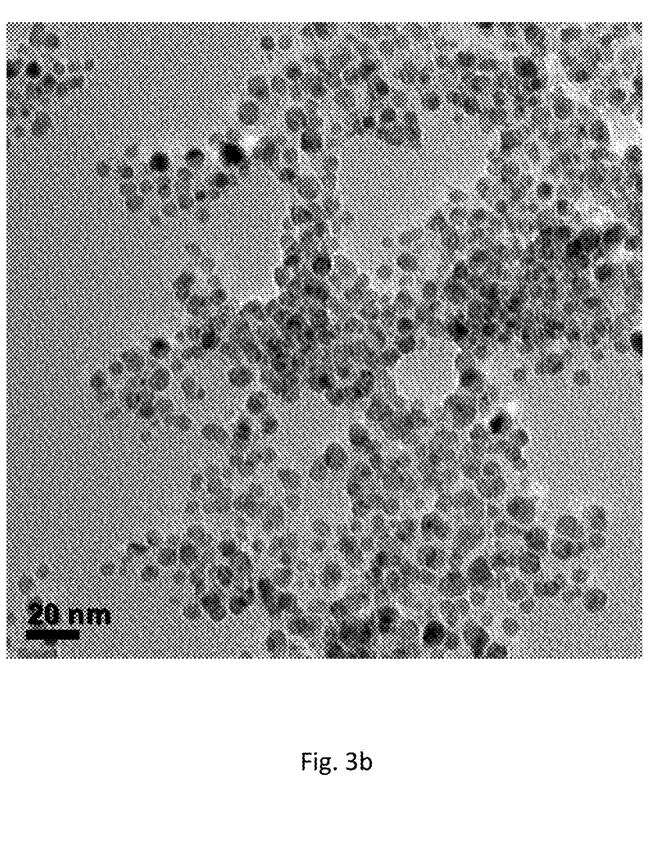
FIG. 3b shows a TEM image of metal catalyst nanoparticles obtained in Example 2.

FIG. 3b shows an image of the obtained metal catalyst nanoparticles prepared in Example 2 using TEM. As can be seen by the image, the obtained metal catalyst nanoparticles are consistently sized and are well-formed.

Figure 6:
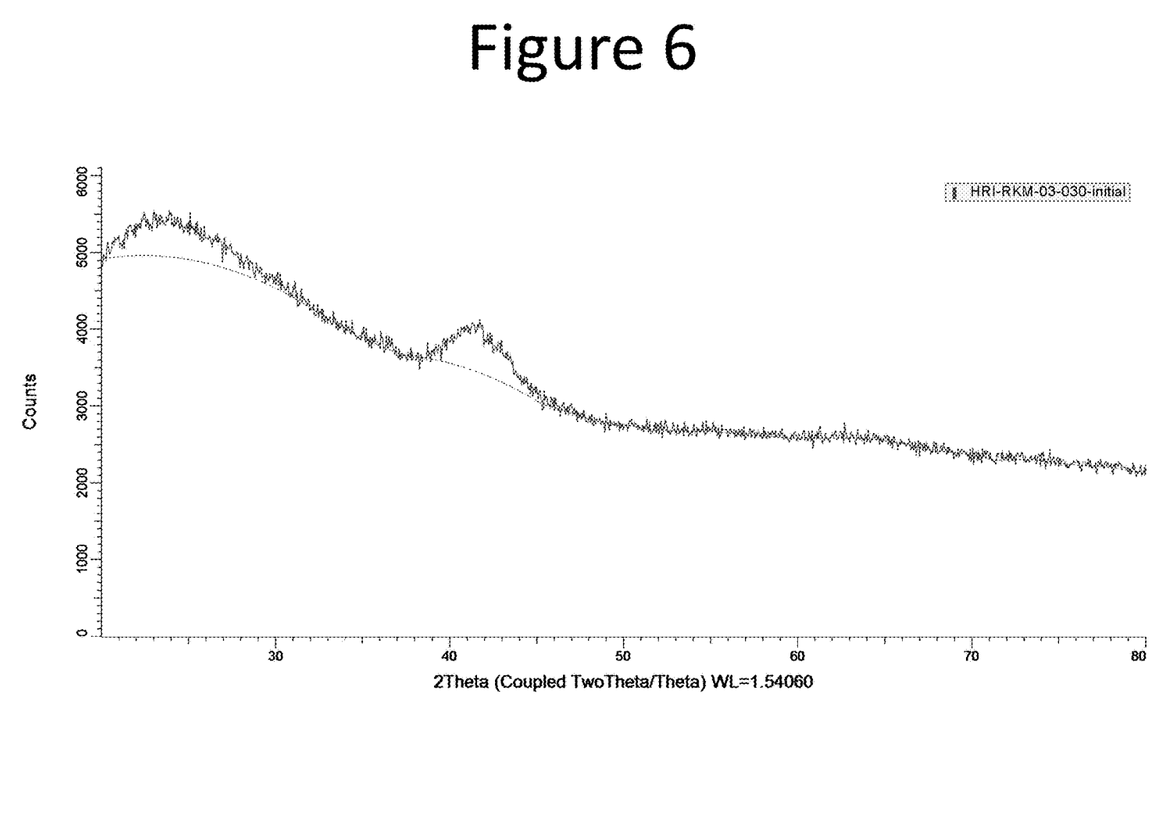
FIG. 6 shows an X-ray diffractogram corresponding to metal catalyst nanoparticles obtained in Example 2.

FIG. 6 shows an X-ray diffractogram corresponding to metal catalyst nanoparticles obtained in Example 2.

Example 3 Comparative: Production of Copper Nanoparticles Under Argon

First, in order to adjust the solution's pH to about 10, 14.5 M (0.5 mL) of $NH_4OH$ was added to a stirring metal catalyst precursor solution comprising 20.43 mM of $CuCl_2.2H_2O$ (0.24 g, 1.4 mmol) and 20.1 mM of CTAB (0.68 g, 1.87 mmol) in 93 mL of deionized water in a Schlenk flask at room temperature (i.e., 23° C.) under argon. A reducing agent solution was prepared by adding 17.66 M of hydrazine hydrate (50-60%, 3 mL) to a solution comprising 32.81 mM of CTAB (0.68 g, 1.87 mmol) and 3.16 mM of citric acid monohydrate (0.036 g, 0.18 mmol) in 57 mL of deionized water. The reducing agent solution was then injected into the flask over 5 minutes via a 60 mL syringe and a syringe pump. Upon injection of the reducing agent solution, the combined metal catalyst precursor and reducing agent solution changed from a tan color to clear.

Immediately following the reducing agent solution injection, a solution comprising 2.5 mmol (0.53 g) of citric acid dissolved in 5 mL of deionized water was injected into the flask via a syringe and a needle all at once under argon. The mixture was then stirred for 3 hours under argon.

The obtained metal catalyst nanoparticles were then separated by centrifuge (5 minutes at 12,000 rpm) using falcon tubes. The supernatant was discarded and the obtained metal catalyst nanoparticles were washed twice with ethanol (10 mL each wash).

Figure 7:
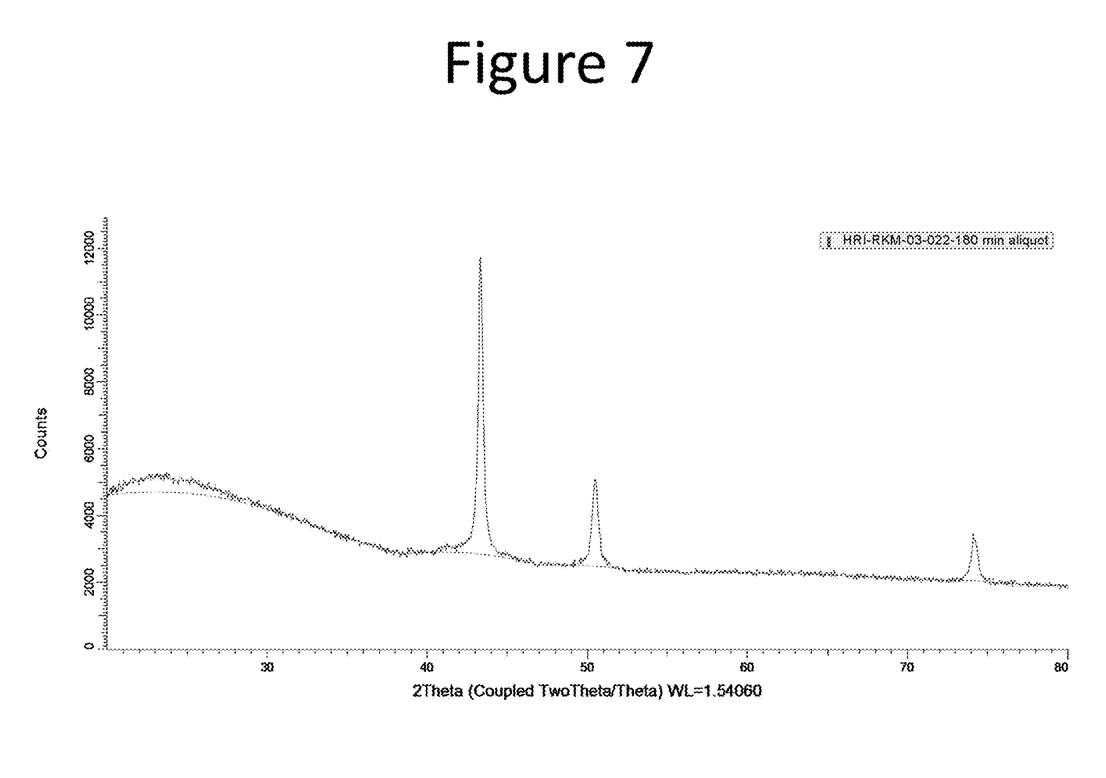
FIG. 7 shows an X-ray diffractogram corresponding to metal catalyst nanoparticles obtained in Example 3.

FIG. 7 shows an X-ray diffractogram corresponding to metal catalyst nanoparticles obtained in Comparative Example 3. As can be seen by FIG. 7, the pXRD pattern indicates that the size of the obtained metal catalyst nanoparticles in Comparative Example 3 (i.e., wherein the combined metal catalyst precursor and reducing agent solution was not exposed to air) is not as small as those nanoparticles obtained in Examples 1 and 2 (i.e., wherein the combined metal catalyst precursor and reducing agent solution was exposed to air).

What is claimed is:

1. A method for preparing metal catalyst nanoparticles, the method comprising:
    a) providing a metal catalyst precursor solution;
    b) initiating nucleation and/or growth of metal catalyst nanoparticles by continuously feeding a reducing agent solution to the metal catalyst precursor solution over a period of time, $t_0$, $t_0$ ending at a time point $t_1$, wherein the reducing agent solution is fed to the metal catalyst precursor solution in a first atmosphere; and
    c) quenching the combined reducing agent and metal catalyst precursor solution, wherein quenching comprises:
    contacting the combined reducing agent and metal catalyst precursor solution with a gaseous quenching agent, and
    contacting the combined reducing agent and metal catalyst precursor solution with a liquid quenching agent comprising an active quenching component.

2. The method according to claim 1, wherein contacting the combined reducing agent and metal catalyst precursor solution with the gaseous quenching agent is initiated at a time point time point $t_2$ and contacting the combined reducing agent and metal catalyst precursor solution with the liquid quenching agent is initiated at a time point time point $t_3$, wherein $t_3$ is at the same time as or after $t_2$.

3. The method according to claim 2, wherein $t_2$ immediately follows $t_1$.

4. The method according to claim 2, wherein $t_3$ immediately follows $t_2$.

5. The method according to claim 1, wherein the reducing agent solution comprises one or more surfactants; the metal precursor solution comprises one or more surfactants and/or a metal, metal salt, and/or hydrate thereof; and wherein the combined reducing agent and metal catalyst precursor solution comprises a molar ratio of total surfactants to metal, metal salt, and/or hydrate thereof of between 1:1 to 10:1.

6. The method according to claim 5, wherein the liquid quenching agent further comprises water, and wherein the active quenching component has a molecular weight of less than 400 g/mol.

7. The method according to claim 5, wherein the active quenching component comprises citric acid.

8. The method according to claim 5, wherein the one or more surfactants of the reducing agent solution are present in the reducing agent solution at a molar ratio of between 1:1 to 20:1.

9. The method according to claim 5, wherein the one or more surfactants of the reducing agent solution comprises citric acid and CTAB, and wherein the one or more surfactants of the metal catalyst precursor solution comprises CTAB.

10. The method according to claim 1, wherein the gaseous quenching agent comprises oxygen.

11. The method according to claim 1, wherein the gaseous quenching agent reduces the nucleation and/or growth rate of the metal catalyst nanoparticles and wherein the liquid quenching agent stops the nucleation and/or growth of the metal catalyst nanoparticles.

12. The method according to claim 1, wherein the metal catalyst precursor solution comprises copper.

13. The method according to claim 12, wherein the metal catalyst precursor solution further comprises CTAB.

14. The method according to claim 13, wherein the copper is present as $CuCl_2 \cdot 2H_2O$, the $CuCl_2 \cdot 2H_2O$ being present in the metal catalyst precursor solution at a concentration of 15.6 mM, and wherein the CTAB is present in the metal catalyst precursor solution at a concentration of 20.8 mM.

15. A method for preparing metal catalyst nanoparticles, the method comprising:
a) providing a metal catalyst precursor solution comprising $CuCl_2 \cdot 2H_2O$ and CTAB;
b) initiating nucleation and/or growth of metal catalyst nanoparticles by continuously feeding a reducing agent solution to the metal catalyst precursor solution in a first environment free of oxygen over a period of time, $t_0$, $t_0$ ending at a time point $t_1$, wherein the reducing agent solution comprises CTAB, citric acid, and hydrazine; and
c) quenching the combined reducing agent and metal catalyst precursor solution, wherein quenching comprises a first quenching step and a second quenching step, the second quenching step occurring after the first quenching step,
wherein the first quenching step occurs following $t_1$ and comprises exposing the combined reducing agent and metal catalyst precursor solution to air, and
wherein the second quenching step comprises contacting the combined reducing agent and metal catalyst precursor solution with citric acid dissolved in water.

16. A method for preparing metal catalyst nanoparticles, the method comprising:
a) providing a metal catalyst precursor solution;
b) initiating nucleation and/or growth of metal catalyst nanoparticles by continuously feeding a reducing agent solution to the metal catalyst precursor solution over a period of time, $t_0$, $t_0$ ending at a time point $t_1$; and
c) quenching the combined reducing agent and metal catalyst precursor solution such that the metal catalyst nanoparticles have a particle size distribution wherein at least 90% of the metal catalyst nanoparticles have a diameter of within 10 nm range.

17. The method according to claim 16, wherein the quenching comprises a first quenching step and a second quenching step.

18. The method according to claim 17, wherein the first quenching step comprises contacting the combined reducing agent and metal catalyst precursor solution with a gaseous quenching agent.

19. The method according to claim 17, wherein the second quenching step comprises contacting the combined reducing agent and metal catalyst precursor solution with a liquid quenching agent.

20. The method according to claim 16, wherein the metal catalyst nanoparticles have a particle size distribution wherein at least 90% of the metal catalyst nanoparticles have a diameter of within a 5 nm range.

\* \* \* \* \*